United States Patent
Mouri

(10) Patent No.: US 8,593,649 B2
(45) Date of Patent: Nov. 26, 2013

(54) DEFECT DETECTOR FOR CORRUGATED CARDBOARD FLUTES

(75) Inventor: Shinichi Mouri, Nakatsugawa (JP)

(73) Assignee: Phonic Co., Ltd., Kasugai-shi, Aichi (JP)

( * ) Notice: Subject to any disclaimer, the term of this patent is extended or adjusted under 35 U.S.C. 154(b) by 811 days.

(21) Appl. No.: 12/676,990

(22) PCT Filed: Dec. 11, 2007

(86) PCT No.: PCT/JP2007/073836
§ 371 (c)(1),
(2), (4) Date: Mar. 8, 2010

(87) PCT Pub. No.: WO2009/075025
PCT Pub. Date: Jun. 18, 2009

(65) Prior Publication Data
US 2010/0195115 A1   Aug. 5, 2010

(51) Int. Cl.
*B31B 1/00* (2006.01)
*G01B 11/02* (2006.01)

(52) U.S. Cl.
USPC .... 356/622; 356/638; 356/239.1; 250/559.19

(58) Field of Classification Search
USPC ................................ 356/239.7, 237.2, 638
See application file for complete search history.

(56) References Cited

U.S. PATENT DOCUMENTS

| | | | |
|---|---|---|---|
| 5,351,308 A | | 9/1994 | Kaminer et al. |
| 5,993,367 A | * | 11/1999 | Hattori et al. ................... 493/12 |
| 6,323,502 B1 | * | 11/2001 | Battut ....................... 250/559.19 |
| 7,196,785 B2 | * | 3/2007 | Nishiyama et al. ........ 356/237.4 |

FOREIGN PATENT DOCUMENTS

| | | |
|---|---|---|
| DE | 102005032244 A1 | 1/2007 |
| JP | 61-225038 A | 10/1986 |
| JP | 62-299701 A | 12/1987 |
| JP | 1-267404 A | 10/1989 |
| JP | 2571520 B2 | 1/1997 |

OTHER PUBLICATIONS

International Search Report of PCT/JP2007/073836, mailing date of Jan. 29, 2008.

* cited by examiner

*Primary Examiner* — Gregory J Toatley
*Assistant Examiner* — Rebecca C Bryant
(74) *Attorney, Agent, or Firm* — Westerman, Hattori, Daniels & Adrian, LLP

(57) ABSTRACT

A defect detector for corrugated cardboard flutes comprises an optical projector for projecting to traveling flutes an inspection light having an effective line of which the length is about one pitch of flutes inclined slightly so that a tip of a normal flute is positioned on or slightly under the posterior end of the effective line and simultaneously a slope of an adjacent normal flute is positioned on the anterior end side of the effective line, an optical receiver equipped with a light-receiving element for receiving the inspection light reflected by a flute to output information according to the light-receiving position, and normal or abnormal determining means which determines that the flute height is normal if the light-receiving position detected is within an allowable range Wp.

4 Claims, 4 Drawing Sheets

DEFECT DETECTOR FOR CORRUGATED CARDBOARD FLUTES

This application is the national stage of International Application No. PCT/JP2007/073836, filed on Dec. 11, 2007.

BACKGROUND OF THE INVENTION

1. Field of the Invention

The present invention relates to defect detectors for detecting whether corrugated cardboard flutes (columns) are higher than or lower than an allowable range.

2. Description of Related Art

In the manufacture of corrugated cardboard sheets, at a step of forming a medium base paper into a corrugated shape and laminating the corrugated medium to a liner, a defective portion such as a crushed flute mountain (flute crush), an inclined flute mountain (flute inclination), or a projecting flute mountain (flute projection) caused by partial detachment of the corrugated medium from the liner or the like may be generated, which results in unevenness in thickness of the corrugated cardboard sheet. The present applicant has proposed a method of detecting the occurrence of this above-described defect by means of a method wherein flutes are examined on the manufacturing line during production of cardboard sheets, rather than after production is complete (See Patent Document 1).

This method is a method in which "a limited distance sensor for detecting that an object to be detected is positioned on an effective line of an inspection light is used, the effective line is set to a length approximately equal to one pitch of corrugated cardboard flutes, an inspection light is slightly inclined so that a tip of a normal flute mountain is positioned on or slightly under the posterior end of the effective line and simultaneously a slope of an adjacent normal flute mountain is positioned on the anterior end side of the effective line, normalcy is detected from the fact that normal mountains of traveling flutes are constantly positioned on a part of the effective line, abnormality of a flute mountain higher than a standard flute height is detected from the fact that a high flute mountain passes the inspection light on the sensor side outside the posterior end of the effective line, and abnormality of a flute mountain lower than the standard flute height is detected from the fact that a flute does not exist on the effective line because a slope of a low mountain does not reach the anterior end of the effective line when the previous mountain is positioned outside the posterior end of the effective line".

Conventionally, the method has been realized by a detector including an optical projector for projecting to traveling flutes an inspection light inclined to graze a flute tip of a normally corrugated medium and reach a slope of an adjacent normal flute mountain thereto, and an optical receiver for detecting whether a light is received or not within a light-receiving range capable of receiving only the inspection light reflected by a flute mountain on the effective line.

According to such a detector, when the heights of flute mountains are within the allowable range, the inspection light projected by the optical projector is constantly reflected on the effective line and is received by the optical receiver. On the other hand, when the height of any flute mountain is higher than the allowable range, the inspection light is reflected by the flute mountain outside the posterior end of the effective line, so the optical receiver does not receive the inspection light. Further, when the height of any mountain is too low to reach the allowable range, the inspection light is reflected by the flute mountain outside the anterior end of the effective line, so the optical receiver does not receive the inspection light similarly.

Therefore, while the light is being detected by the optical receiver, it can be determined that the height of a flute is within the allowable range, and while the light is not detected by the optical receiver, it can be detected that either defect (i.e., the height of a flute is higher or lower than the allowable range) has been generated. That is, without requiring actual measurement of the height of a flute, whether the height of the flute is normal or not can be detected easily by detecting whether the optical receiver receives the inspection light or not.

[Patent Document 1] Japanese Patent No. 2571520

SUMMARY OF THE INVENTION

Technical Problem

In such a detecting method as described above, in order to adjust detection accuracy, in other words, in order to change the allowable range of the flute height, it is required to change the length or the position of the effective line. However, in order to change the length or the position of the effective line in the conventional detector, it is required to change the angle of the inspection light projected by the optical projector, the position of the optical receiver, or the focusing angle of the reflected light, so that it is difficult to perform adjustment.

Further, as a fluted medium of a corrugated cardboard material, there is a plurality of corrugation types such as "A" flute (the flute height is in a range of 4.5 to 4.8 mm), "B" flute (the flute height is in a range of 2.5 to 2.8 mm), and "C" flute (the flute height is in a range of 3.5 to 3.8 mm), and if the corrugation types of corrugating mediums are different, the lengths or positions of the effective lines are largely different. Therefore, in the conventional detector in which it is difficult to change the length or position of the effective line, it is difficult to make use of the same detector to detect defects in flutes different in corrugation type.

Additionally, in recent years, a corrugator which can replace a corrugating roll for forming a medium base paper into a corrugated shape by another in a cassette manner, and can manufacture corrugated cardboard sheets varying in corrugation type on the same manufacturing line has been widely spread. Therefore, a detector which can determine whether or not the heights of flutes with a plurality of corrugation types are normal has been strongly desired.

The present invention provides, in view of the above circumstances, a defect detector for corrugated cardboard flutes, capable of easily adjusting detection accuracy and detecting whether the heights of flutes with a plurality of corrugation types are normal or not.

Solution to Problem

In order to solve the above problems, a defect detector for corrugated cardboard flutes according to the present invention is "a defect detector for corrugated cardboard flutes including an optical projector which projects, to traveling flutes, an inspection light having an effective line of which the length is about one pitch of flutes inclined slightly so that a tip of a normal flute mountain is positioned on or slightly under the posterior end of the effective line and simultaneously a slope of an adjacent normal flute mountain is positioned on the anterior end side of the effective line, and determining whether the height of a flute is normal or abnormal based upon the inspection light reflected by a flute mountain, comprising an optical receiver equipped with a light-receiving element for receiving the inspection light reflected by a flute mountain to output information corresponding to the light-receiving position, and normal or abnormal determining means for, if the light-receiving position detected from the information output by the light-receiving element is within an allowable range, determining that the height of the flute is normal, and, if the light-receiving position is out of the allowable range, determining that the height of the flute is abnormal".

As the "optical projector", a device may be used which projects light using a light-emitting element such as a light-emitting diode or a laser diode.

As the "light-receiving element" for outputting "information corresponding to the light-receiving position", for example, a PSD (position sensitive detector) element may be used. The PSD element is a horizontally-long photoelectric element, provided with output terminals on both ends, current is output to both the output terminals when an electric charge is generated by light reception. At this time, since resistance is proportional to a distance from the light-receiving position to the output terminals, the light-receiving position can be detected as a centroidal position of a light quantity based upon the ratio of currents (or converted voltages) output from the two output terminals. Therefore, when the PSD element is used as the light-receiving element, the ratio of currents or voltages output from the two output terminals corresponds to "information corresponding to the light-receiving position" in the present invention.

Alternatively, as the "light-receiving element for outputting information according to a light-receiving position", a plurality of photodiodes provided in array can be used, and in addition to the photodiode array, a CMOS image sensor, a CCD image sensor, or the like can be used. In this case, since the photodiode generating electric charge by light reception can be specified by its output, the light-receiving position can be detected as a position of the specified photodiode. That is, in this case, the output from the photodiode which has received light and positional information (coordinates or the like) of the photodiode corresponding to "information corresponding to the light-receiving position" in the present invention.

Incidentally, the "optical receiver" can be configured to include a lens which focuses reflected light from a flute mountain, an amplifier which amplifies an output from the light-receiving element, and the like, in addition to the light-receiving element.

The "normal or abnormal determining means" can be configured as a program for causing a computer to function. Alternatively, the "normal or abnormal determining means" can be configured using a comparator or an operational amplifying circuit which can compare an analog voltage output from the light-receiving element corresponding to the light-receiving position and a voltage corresponding to the upper limit or the lower limit of the allowable range with each other.

According to the present invention, since the light-receiving position of the inspection light reflected by a flute mountain can be specified owing to the above configuration, the "allowable range of the flute height" can be changed as an "allowable range of the light-receiving position". Thereby, without necessitating the changes of the angle of the inspection light, the position of the optical receiver, or the like, it becomes possible to adjust the detection accuracy easily by changing the length or position of the effective line.

In addition, even when corrugated cardboard materials differing in corrugation type are manufactured on the same manufacturing line of the corrugator, whether or not the height of a flute is normal can be determined by the same detector by shifting the allowable range of the light-receiving position without demanding the changes of the angle of the inspection light, the position of the optical receiver, or the like.

The defect detector for corrugated cardboard flutes according to the present invention further comprises "a storage device which has stored an allowable range database associating flute type information including corrugation type information, medium information, and liner information with allowable range data, information acquiring means which acquires the flute type information from a production management device of the corrugator, and allowable range shifting means for reading, from the allowable range database, the allowable range data associated with the flute type information acquired by the information acquiring means to shift the allowable range so as to conform the same to the read allowable range data".

The "corrugation type information" can be a type of corrugation such as "A" flute, "B" flute, or "C" flute, or the number of flutes per unit length. Further, as a "medium information", the thickness of a medium base paper, basis weight, model number, and the like can be taken as an example, and as a "liner information", the thickness of a liner, basis weight, model number, and the like can be taken as an example.

The "allowable range data" can be described by a combination of the upper limit and the lower limit of the allowable range, and can be set based upon calculation, actual measurement, or the like, by the flute type information made of a combination of the corrugation type information, the medium information, and the liner information or the like.

As the "storage device", an embedded memory of a computer, or an external storage device such as a hard disk, a flexible disk, or a CD-R may be used. Further, the "information acquiring means" and the "allowable range shifting means" can be realized as a function of a computer, the processing of which is performed by a central processor according to a program stored in a main storage device.

If the basis weights (and thus the thickness) of a paper used as a medium base paper or a liner are different even if the corrugation types are the same, the heights of flutes are different. Then, the production management device of the corrugator generally includes various kinds of information related to corrugated cardboard sheets to be manufactured such as corrugation types, combinations of a medium base paper and a liner to be attached with each other, respective model numbers of medium base papers or liners, respective basis weight of medium base papers or liners, and manufacturing order in a case of manufacturing plural kinds of corrugated cardboard sheets.

In the present invention, among these information items which are included by the production management device of the corrugator, the flute type information associated with the flute height is utilized. Thereby, the allowable range data suitable for normality determination of the height of a flute of a corrugated cardboard sheet to be manufactured is selected from the allowable range database, and whether or not the height of a flute is normal can be determined more properly.

As above, as an effect of the present invention, it is possible to provide a defect detector for corrugated cardboard flutes which can adjust the detection accuracy easily and can determine whether the heights of flutes with a plurality of corrugation types are normal or not by the same detector.

DETAILED DESCRIPTION OF THE INVENTION

Hereinafter, a defect detector for corrugated cardboard flutes which is a best mode of the present invention will be explained in reference to FIG. 1 to FIG. 6. Here, FIG. 1 to FIG. 4 are explanatory diagrams for explaining a detection principle of the defect detector for corrugated cardboard flutes which is an embodiment of the present invention, FIG. 5 is a block diagram showing a configuration of the defect detector for corrugated cardboard flutes, and FIG. 6 is a block diagram showing a functional configuration of the defect detector for corrugated cardboard flutes in FIG. 5.

Figure 1:
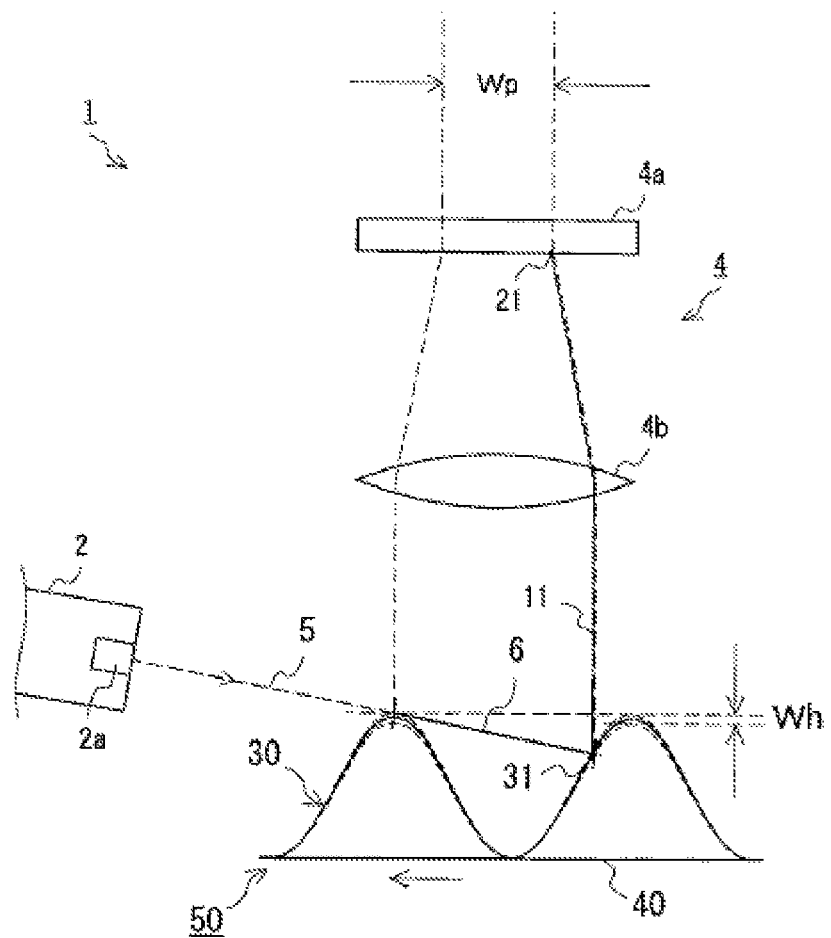
FIG. 1 is an explanatory diagram for explaining a detection principle of a defect detector for corrugated cardboard flutes which is an embodiment of the present invention.

As shown in FIG. 1, a defect detector for corrugated cardboard flutes 1 (hereinafter, "detector 1") of the embodiment is a detector 1 which includes an optical projector 2 for projecting, to a traveling flutes, an inspection light 5 having an effective line 6 of which the length is about one pitch of flutes inclined slightly so that a tip of a normal flute mountain 31 is positioned on or slightly under the posterior end of the effective line 6 and simultaneously a slope of an adjacent normal flute mountain 31 is positioned on the anterior end side of the effective line 6, and determining whether the height of a flute is normal or abnormal based upon the inspection light 5 reflected by a flute mountain, the detector 1 comprising an optical receiver 4 equipped with a light-receiving element 4a for receiving the inspection light 5 reflected by a flute mountain to output information corresponding to the light-receiving position. Incidentally, FIG. 1 illustrates a case in which the tip of the normal flute mountain 31 is positioned slightly below the posterior end of the effective line 6 and the anterior end of the effective line 6 is positioned slightly beyond the slope of the normal flute mountain 31 adjacent thereto, and in this case, an allowable range of the flute height is Wh.

To explain the above in more detail, the optical projector 2 includes a light-emitting element 2a, and projects the inspection light 5 from the light-emitting element 2a. Further, the optical receiver 4 includes a PSD element serving as the light-receiving element 4a and a lens 4b focusing the reflected light. Further, the optical projector 2 and the optical receiver 4 are disposed in the vicinity of a manufacturing line in the process of conveying a single-faced corrugated cardboard sheet 50 formed by attaching a linerboard 40 on one side of a corrugated medium 30 to a step of being laminated to another linerboard (not shown) on the other side. Further, the optical projector 2 and the optical receiver are provided with plural pairs at 50 mm to 100 mm intervals with respect to a width direction of the single-faced corrugated cardboard sheet 50.

Figure 5:
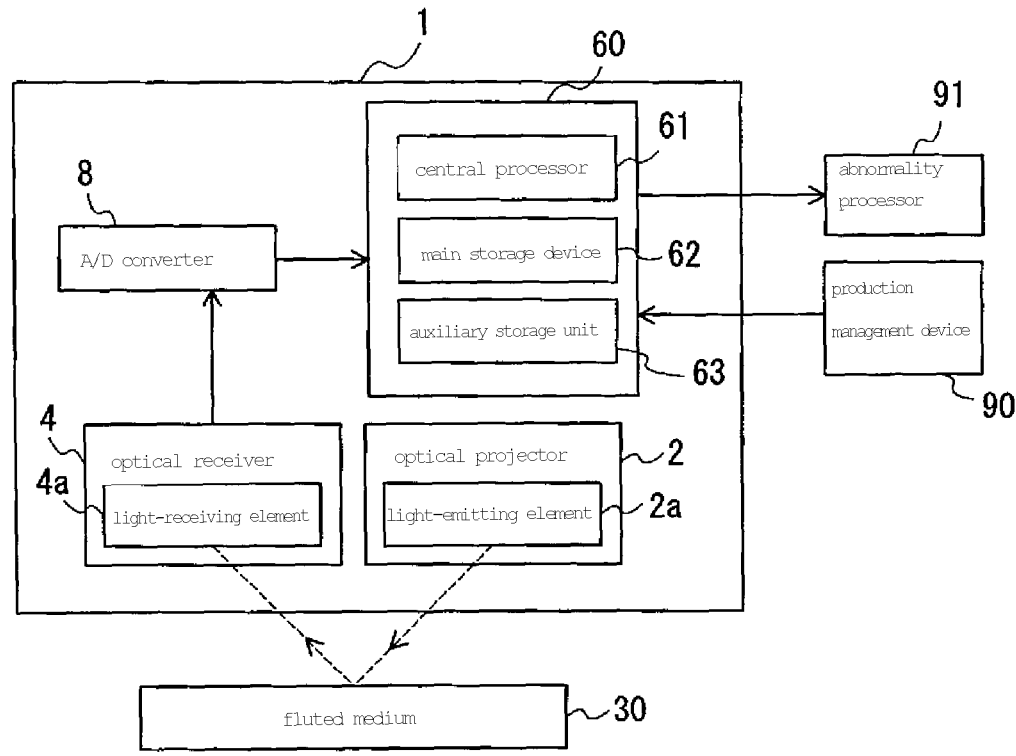
FIG. 5 is a block diagram showing a configuration of the defect detector for corrugated cardboard flutes.
Figure 6:
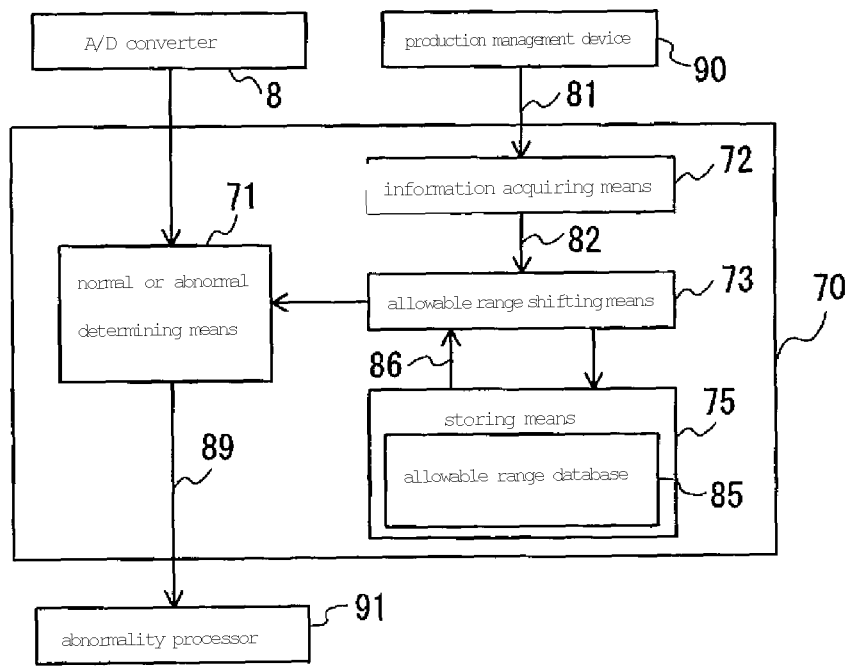
FIG. 6 is a block diagram showing a functional configuration of the defect detector for corrugated cardboard flutes in FIG. 5.

Additionally, detector 1 of the present embodiment includes a computer 60 connected to a production management device 90 of the corrugator by wire or wireless communication, as shown in FIG. 5. Here, computer 60 includes a main storage device 62, a central processor 61 for performing processing according to a program stored in the main storage device 62, and an auxiliary storage unit 63. Here, the auxiliary storage unit 63 of the present embodiment corresponds to a storage device of the present invention.

Further, detector 1 includes an A/D converter 8 for digitally converting an analog voltage output from optical receiver 4, and an abnormality processor 91 for alarming abnormality with warning lamp, warning sound, or the like when a corrugated cardboard sheet with a defective flute height is generated, and eliminating the corrugated cardboard with a defective flute height from a manufacturing line based upon detection of a conveying distance by an encoder.

A main functional configuration in detector 1 is a control mechanism unit 70 of the computer 60, and, as shown in FIG. 6, it includes a normal or abnormal determining means 71 which compares a light-receiving position with an upper limit and a lower limit of an allowable range Wp based upon a voltage output according to the light-receiving position from the light-receiving element 4a, and makes normal determination if the light-receiving position is within the allowable range Wp, or makes abnormal determination if the light-receiving position is out of the allowable range Wp.

Further, control mechanism unit 70 includes storing means 75 which has stored an allowable range database 85 associating flute type information 82 including corrugation type information, medium information, and liner information with allowable range data 86, information acquiring means 72 which acquires production management information 81 including the flute type information 82 from the production management device 90 of a corrugator, and allowable range shifting means 73 which reads the allowable range data 86 associated with the acquired flute type information 82 from the allowable range database 85, and shifts the allowable range Wp so as to conform the same to the read allowable range data 86.

Next, the detection principle in detector 1 and the defects detecting method in detector 1 will be explained. First, a case in which a flute mountain 31 includes a normal height will be explained. As illustrated in FIG. 1, when an inspection light 5 is projected from light-emitting element 2a of optical projector 2 in a direction opposite to a travelling direction of a corrugated medium, inspection light 5 is reflected by flute mountain 31 with a normal height. After focused on the light-receiving lens 4b, reflected light 11 is received by light-receiving element 4a (PSD element), and a voltage is output from terminals on both ends of light-receiving element 4a by the ratio corresponding to a light-receiving position 21. An analog voltage output from the light-receiving element 4a is input into the computer 60 after digitally converted by the A/D converter 8, and is compared with the upper limit and the lower limit of the allowable range Wp of the light-receiving position corresponding to the allowable range Wh by the normal or abnormal determining means 71. Then, since light-receiving position 21 is within the allowable range Wp, it is determined that the height of the flute is normal.

Figure 2:
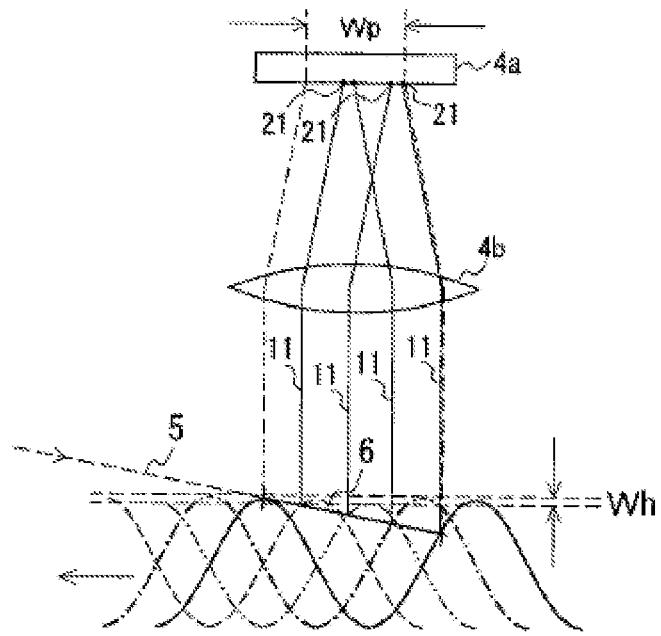
FIG. 2 is an explanatory diagram for explaining the detection principle of the defect detector for corrugated cardboard flutes.
Figure 3:
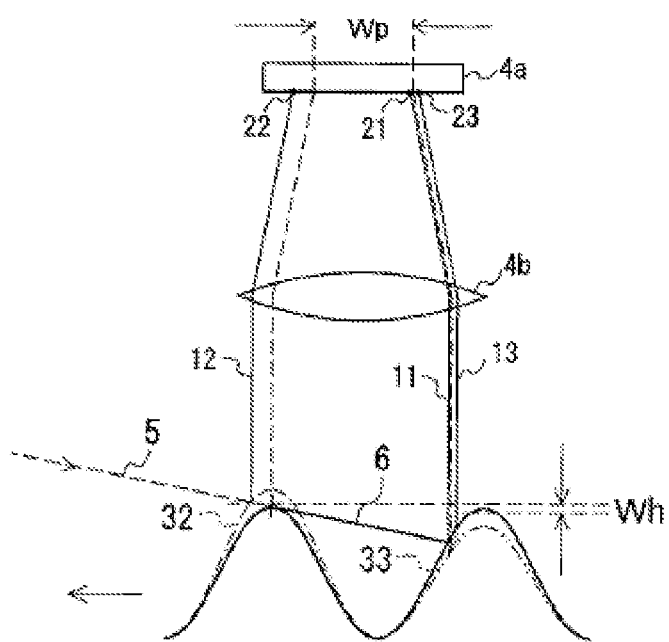
FIG. 3 is an explanatory diagram for explaining the detection principle of the defect detector for corrugated cardboard flutes.

When the heights of flute mountains are within the allowable range Wh, as shown in FIG. 2, inspection light 5 is constantly reflected by a flute mountain on effective line 6, and light-receiving position 21 of the reflected light 11 is constantly positioned within the allowable range Wp. To the contrary, as shown in FIG. 3, in a case of a flute mountain 32 which is high beyond the allowable range Wh, inspection light 5 is reflected outside effective line 6, and a light-receiving position 22 of reflected light 12 is out of the allowable range Wp. Further, in a case of a flute mountain 33 which is too small to reach the allowable range Wh, inspection light 5 is similarly reflected outside the effective line 6, a light-receiving position 23 of reflected light 13 is out of the allowable range Wp. Therefore, by detecting whether or not a light-receiving position of reflected light is within the allowable range Wp, it can be known whether or not the height of the flute is within the allowable range Wh, so that determination can be made about whether the height of the flute is normal or abnormal.

When it is determined by the normal or abnormal determining means 71 that the height of the flute is abnormal, an abnormal signal 89 is sent from the normal or abnormal determining means 71 toward the abnormality processor 91. Then, by the abnormality processor 91 receiving abnormal signal 89, abnormal processing such as lighting-up of the warning lamp, actuation of warning sound buzzer, or elimination of a corrugated cardboard with an abnormal flute height from the manufacturing line is performed.

Figure 4:
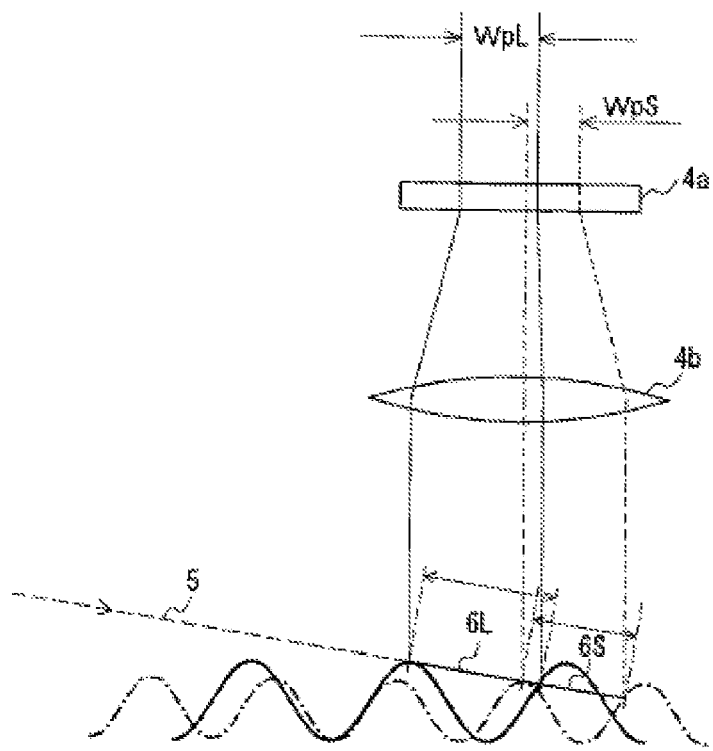
FIG. 4 is an explanatory diagram for explaining the detection principle of the defect detector for corrugated cardboard flutes.

When a corrugation type of a flute to be inspected is changed, or when inspection accuracy is wanted to be changed, the allowable range Wp of a light-receiving position is shifted. For example, as shown in FIG. 4, when the allowable range is shifted from an allowable range WpL, suitable for determination performed when a corrugating flute height is high, to an allowable range WpS, the effective line is changed from an effective line 6L to an effective line 6S accordingly. Thereby, normal or abnormal determination of the flute height with a low corrugating flute height can be performed. Further, by adjusting the length or position of the allowable range Wp, the length and position of the effective line can be changed slightly, so the inspection accuracy can be finely adjusted.

Here, though shifting the allowable range Wp can be performed by shifting, by input from the outside, the upper limit and the lower limit being compared with a light-receiving position by the normal or abnormal determining means 71, detector 1 of the present embodiment can utilize information owned by production management device 90 of the corrugator to shift the allowable range Wp automatically. The production management device 90 of the present embodiment includes production management information 81 comprising various information such as types of corrugated cardboard sheets to be manufactured (single-faced corrugated cardboard, double-faced corrugated cardboard, double wall corrugated cardboard, and the like), corrugation types, combinations of a medium base paper and a liner to be attached to each other, model numbers of medium base papers or liners, basis weight, and manufacturing order in a case of manufacturing plural kinds of corrugated cardboard sheets.

In the present embodiment, when a manufacturing condition of a corrugated cardboard sheet is changed such as a case of changing a corrugation type, or a case of changing kinds of a medium base paper and a liner or a combination thereof even if the corrugation type is the same, production management information 81 is sent from production management device 90 to computer 60 of detector 1. On the side of detector 1, information acquiring means 72 acquires production management information 81 sent from production management device 90, and extracts flute type information 82 associated with the flute height from production management information 81 including various information.

Next, allowable range shifting means 73 reads allowable range data 86 associated with the flute type information 82 extracted by information acquiring means 72 from allowable range database 85 stored in storing means 75. Then, based upon read allowable range data 86, the upper limit and the lower limit which are standards for comparison with a light-receiving position by the normal or abnormal determining means 71 are shifted by allowable range shifting means 73, and the allowable range Wp of the light-receiving position is shifted.

As described above, according to the detector 1 of the present embodiment, without requiring such complex adjustment as changing the angle of the inspection light 5, the height of the optical projector 2, or the position of the optical receiver 4, whether the heights of corrugated cardboard flutes with different corrugation types are normal or not can be determined by the same detector 1, and the detection accuracy can be easily adjusted.

Further, by shifting the allowable range Wp of a light-receiving position, the allowable range Wh of the flute height can be shifted. Therefore, even during operation of the manufacturing line, the allowable range Wp and thus the allowable range Wh of the flute height serving as the standard for defect detection can be changed easily and rapidly.

In addition, by utilizing information owned by the production management device 90, a proper allowable range Wp (and thus allowable range Wh) corresponding to the type, thickness, or the like of a medium base paper or a liner to be used actually in the manufacturing line can be set. Therefore, whether a flute height is normal or abnormal can be determined in appropriately corresponding to flute heights slightly different according to a type, a thickness, or the like of the medium base paper or the liner even if corrugation types are the same.

Hereinbefore, though the present invention has been explained through a preferred embodiment, the present invention is not necessarily limited to the above embodiment, and as described below, without departing from the gist of the present invention, various modifications and design change are possible.

For example, in the above embodiment, the case has been illustrated in which the direction in which the inspection light is projected from the optical projector is opposite to the traveling direction of flutes, but the present invention is not limited thereto, so the inspection light may be projected in the same direction as the traveling direction of flutes.

Further, the case in which the computer of the detector passively receives the production management information sent from the production management device has been illustrated, but the present invention is not limited thereto, so it is possible to perform setting in which a signal requiring transmission of information is sent to the production management device from the defect detector.

Further, though the case of using a PSD element as a light-receiving element has been illustrated, the present invention is not limited thereto, so a photodiode array or an image sensor can also be used. Further, though a case of disposing plural pairs of a light-emitting element and a light-receiving element in the width direction of a corrugated cardboard sheet is illustrated, the present invention is not limited thereto, so, for example, it is also possible to adopt a configuration in which the light-receiving element is two-dimensional image sensor, and reflected light can be received over almost full width of a corrugated cardboard sheet by one image sensor.

The invention claimed is:
1. A defect detector for corrugated cardboard flutes, said defect detector comprising:
an optical projector configured to project, to traveling flutes, an inspection light having an effective line of which the length is about one pitch of flutes inclined slightly so that a tip of a normal flute mountain is positioned on or slightly under a posterior end of the effec- tive line and simultaneously a slope of an adjacent normal flute mountain is positioned on an anterior end side of the effective line;

an optical receiver comprising a light-receiving element configured to receive the inspection light reflected by a flute mountain to output information corresponding to a light-receiving position;

a normal or abnormal determining means for, if the light-receiving position detected from the information output by the light-receiving element is within an allowable range Wp, determining that the height of the flute is "normal", and if the light-receiving position is out of the allowable range Wp, determining that the height of the flute is "abnormal"; and an allowable range shifting means for shifting the allowable range Wp of the light-receiving position to adjust the allowable range Wh of the flute height based on a corrugation type of the corrugated cardboard flutes.

2. The defect detector for corrugated cardboard flutes according to claim 1, comprising a storage device which has stored an allowable range database configured to associate flute type information including corrugation type information, medium information, and liner information with allowable range data, and an information acquiring means which acquires the flute type information from a production management device, wherein the allowable range shifting means reads, from the allowable range database, the allowable range data associated with the flute type information acquired by the information acquiring means to shift the allowable range so as to conform the allowable range to the read allowable range data.

3. A method for detecting defects in corrugated cardboard flutes, comprising:

projecting an inspection light from an optical projector toward traveling flutes to be inspected, setting an effective line of the inspection light, the effective line having a length of about one pitch of flutes inclined slightly so that a tip of a normal flute mountain is positioned on or slightly under a posterior end of the effective line and simultaneously a slope of an adjacent normal flute mountain is positioned on an anterior end side of the effective line, receiving the inspection light reflected by a flute mountain of a flute to be inspected in an optical receiver, the optical receiver comprising a light-receiving element configured to output information corresponding to a light-receiving position, determining in a normal or abnormal determining means if the information corresponding to the light-receiving position detected from the information output by the light-receiving element is within an allowable range or if the light-receiving position is outside of the allowable range, and shifting with an allowable range shifting means the allowable range of the light-receiving position to adjust an allowable range of the flute height based on a corrugation type of the corrugated cardboard flutes.

4. The method of claim 3, further comprising:

storing, in a storage device, an allowable range database configured to associate flute type information including corrugation type information, medium information, and liner information with allowable range data, and acquiring with an information acquiring means the flute type information from a production management device, wherein the allowable range shifting means reads, from the allowable range database, the allowable range data associated with the flute type information acquired by the information acquiring means to shift the allowable range so as to conform the allowable range to the read allowable range data.

\* \* \* \* \*